Feb. 4, 1969  H. G. LINDSEY  3,425,366
MOBILE DESK FOR VEHICLES
Filed Nov. 13, 1967
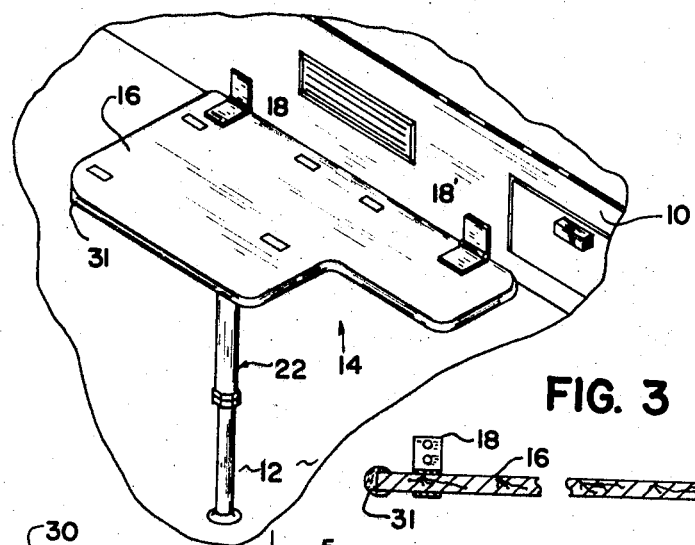
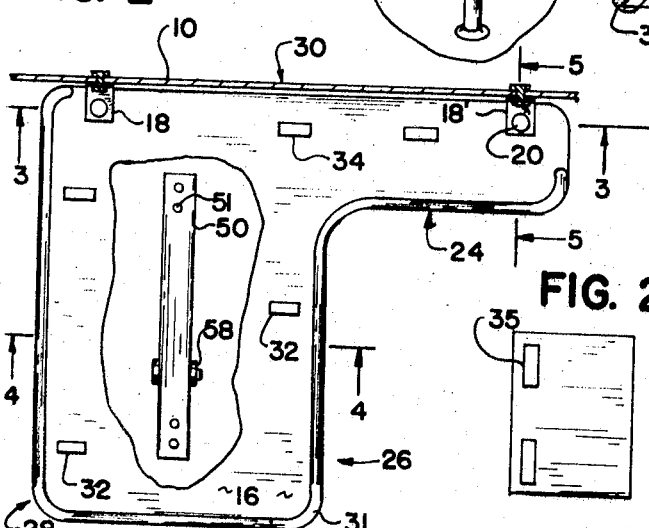
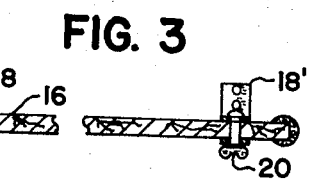
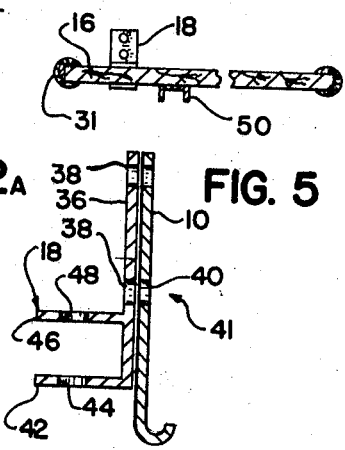
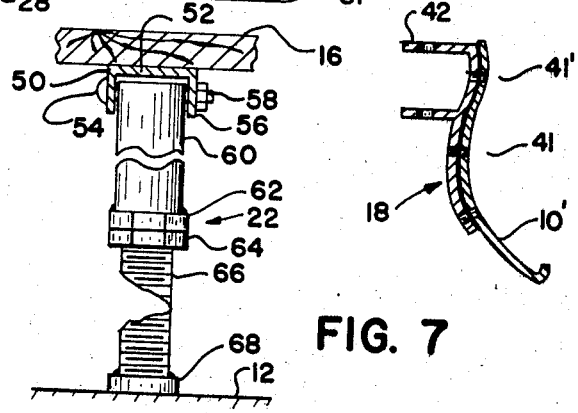
INVENTOR.
HUGHIE G. LINDSEY
BY
MARCUS L. BATES

United States Patent Office 3,425,366
Patented Feb. 4, 1969

3,425,366
MOBILE DESK FOR VEHICLES
Hughie G. Lindsey, P.O. Box 1167,
Andrews, Tex. 79714
Filed Nov. 13, 1967, Ser. No. 682,166
U.S. Cl. 108—45                 6 Claims
Int. Cl. A47b *3/08, 5/06, 23/04*

ABSTRACT OF THE DISCLOSURE

A mobile desk for vehicles which includes a table having an edge portion adapted to be placed adjacent the instrument panel of a vehicle where it is secured thereto by spaced apart brackets attached therebetween. The table is provided with a cut-out which is large enough to enable a person's body to be comfortably seated therein. An inverted U-shaped channel member is attached to the bottom of the table and forms a reinforcing means for the desk while at the same time transmits force in a supporting leg which depends therefrom and into contact with the floor of the vehicle. The spaced apart brackets are provided with depending lugs located at one extremity thereof whereby the brackets may be inverted for use in an automobile while the lugs may be placed in the opposite position for use in a truck to thereby regulate the height of the table with respect to the seat of the vehicle. High friction means are provided on the upper surface of the desk and cooperate with a coacting high friction means provided on the bottom surface of the writing pads and the like which rest on the desk to thereby prevent the material supported by the desk from inadvertently moving about.

BACKGROUND OF THE INVENTION

There are many fields of endeavor which require the simultaneous use of a vehicle and a writing desk. For example, in the oil producing areas of the United States there are men who maintain the various oil wells and pumps in proper operating condition. It is necessary for these technicians to maintain an accurate record of the pumping unit so far as regards its operating hours, types of services provided upon the pump, the amount of chemical injected into various flow lines along with the produced oil, as well as the general condition of the pumping unit. It is also important for route salesmen and the like to keep an accurate record of their large volume of business, and this requires the use of record books, ledgers, note pads and the like. For these reasons it is desirable to have mobile desk in a vehicle which is readily available to the driver so as to enable him to comfortably utilize the desk from either the drivers seat or the passengers side of the vehicle. Sometimes rapid notations are required to be made while the driver is preparing to move to his next point of operation. At other times, it is advantageous for him to be comfortably seated in the passenger side of the vehicle so as to carry out a more detailed description of his activities. Still at other times, it is necessary to completely remove the desk from the vehicle in order to utilize the vehicle for ordinary purposes.

SUMMARY

It is therefore desirable to have a mobile desk which is rigidly secured within a vehicle in a removable manner so as to enable the desk to be dispensed with when it is not in use. It is also desirable to have a sturdy desk which may be utilized from either the drivers or the passengers side. Furthermore, it is desirable to be able to leave pads, ledger books, and the like resting on the surface of the desk where they are readily available for use, and where they are prevented from sliding or blowing from the desk.

It is therefore a primary object of the present invention to provide a mobile desk which may be used in a vehicle and which enables the driver of the vehicle to utilize the desk from either the driver or the passenger side.

A further object of the present invention is the provision of a mobile desk which may be readily installed in operative relationship within a vehicle and which may be readily removed when the desk is not needed.

A still further object of the present invention is the provision of a mobile desk having means thereon which prevents pads, ledger books and the like from becoming misplaced.

A still further object of the present invention is the provision of a mobile desk which may be sold separate from and installed in a multiplicity of vehicles without changing the basic design of the desk.

The above objects are attained in accordance with the present invention by the provision of a desk which is fabricated substantially in accordance with the above objects.

BRIEF DESCRIPTION OF THE DRAWINGS

FIGURE 1 is a perspective view showing the instrument panel and the floor of a vehicle and with a desk made in accordance with the teachings of the present invention operatively installed therein;

FIGURE 2 is a top plan view of the desk seen in FIGURE 1, with some parts being shown in section, and other parts being broken away in order to disclose some additional parts thereof;

FIGURE 2A is a bottom plan view of a writing pad or ledger book which may be used in conjunction with the desk seen in the foregoing figures;

FIGURE 3 is a cross-sectional view taken along line 3—3 of FIGURE 2;

FIGURE 4 is a cross-sectional view taken along line 4—4 of FIGURE 2;

FIGURE 5 is an enlarged cross-sectional view taken along line 5—5 of FIGURE 2;

FIGURE 6 is a modification of the structure disclosed in FIGURE 5; and

FIGURE 7 is an enlarged fragmentary cross-sectional view of part of the device seen in FIGURE 1, with some additional parts being shown in order to better illustrate the details of the present invention.

DESCRIPTION OF THE PREFERRED EMBODIMENTS

Looking now to the details of FIGURE 1, in conjunction with the remaining figures, wherein there is seen an instrument panel 10 of a conventional vehicle having a floor 12 with the mobile desk of the present invention operatively associated therewith as generally indicated at the arrow at numeral 14. The desk includes a flat self supporting surface 16 which is adapted to form a writing surface. Spaced apart brackets 18, 18' are rigidly attached to the instrument panel and removably receive the desk therein. A bolt is seen protruding through the bracket and writing surface at 20. Spaced apart from the instrument panel is a supporting leg 22.

As best seen in FIGURE 2, the desk is defined by a first edge portion adjacent the dash, and has a cut-out formed by a second curved portion at 24 and 26, a third edge portion is seen parallel to and spaced apart from the first edge portion, and a fourth edge portion is seen at 28. Edge portion 28 is adjacent the driver while the cut-out is adjacent the passenger side. Padding 31 circumferentially encloses the marginal edge portion of the desk, save the first edge portion at the instrument panel side 30. Releasable fastener means 32 and 34 are conveniently placed upon the writing surface of the desk and cooperates with fastener means 35 which may be placed upon the back surface of the writing pads, ledger books, and the like in a manner as best seen in FIGURE 2A. The releasable fastener means 32 or 34 engages the fastener 35 when the two are pressed together in face to face relationship. The two are separated from each other by merely lifting the edge of the writing pad with sufficient force to disengage them from one another. (A fastener of this nature is manufactured by the American Thread Company, New York, New York, and is sold by the trade name "Velco" fastener.)

As seen in FIGURES 3 through 6, the spaced apart brackets 18, 18' include a vertical member 36 having apertures 38 formed therein so as to enable a screw to extend through aperture 40 of instrument panel 10 to thereby receive a fastener 41 therethrough. One depending end of the vertical member is turned 90° for a limited length thereof so as to form a first depending lug 42 having an aperture 44 formed therein. Spaced apart from this depending lug is a second lug 46 perpendicularly disposed with respect to the before mentioned vertical member. The second lug is provided with aperture 48 which is superimposed in aligned position with respect to the aperture 44. As seen in FIGURE 6, the bracket may be inverted when it is desired to adjust the height of the writing surface. The bracket may be provided with an additional aperture for a third fastener 41' if desired. The vertical member is seen curved so as to conform to the configuration of the instrument panel.

Centrally located between the first and third edge portions of the desk is an inverted U-shaped channel support member 50 having apertures 51 therein through which screws rigidly affix the member to the bottom surface of the desk. As best seen in FIGURE 7, the U-shaped member includes a portion 52 which is affixed to the bottom portion of the desk, and downwardly depending spaced apart webs 54, 56 which are counterbored so as to receive fastener 58 therethrough. Support leg 22 includes an upper leg portion 60 which is affixed to the channel 50 by the before mentioned bolt 58. Upper leg portion 60 has a nut 62 welded thereon and a lock nut 64 threadedly engages the threaded portion of the lower leg member 66 so as to enable nut 64 to lock leg members 60 and 66 together. Pad 68 transmits the pressure exerted by the leg member against the floor 12.

OPERATION

The mobile desk is best installed in a vehicle by first installing the brackets on a vehicle instrument panel in the manner of either FIGURES 5 or 6, depending upon the desired height of the desk. The brackets may be attached to the instrument panel by utilizing sheet metal screws or bolts as may be desired. Where necessary, vertical members 36 may be deformed to cause the bracket to conform to the curvature of the instrument panel. This is best accomplished by physically bending the member in a vice or by merely using two spaced apart wooden blocks, and striking the member with a ball peen hammer where the curvature is desired. After the brackets have been suitably installed in spaced apart relationship, the first edge portion of the desk is slidably positioned between the spaced apart lugs of the spaced apart brackets and a pin 20 placed through the bracket member 18' in the illustrated manner of FIGURES 1 and 2. It should be noted that a bolt or pin need not be placed through the lugs of bracket member 18 even though both members are identical to each other, for the reason that one pin at 18' is sufficient.

The mobile desk is now ready for use, and each of the report books, writing pads, and the like are provided with the releasable fastening means 35. The fastening means are placed on the books and pads by removing the protective covering from the back of the fastener material. This uncovers contact cement, and when the material is pressed onto the bottom surface of the pads, it will become rigidly cemented in place. By aligning the fastener material 35 with the various pairs 32, 34 of complementary fasteners which have previously been cemented onto a desk, the pads will not move about until they are forced from the surface of the desk in a manner as described above and as is known to those who are familiar with the material. This type of fastener material is usually made of nylon and is similar to a thick fibrous pad in appearance.

The driver can position several different pads or report books upon the desk where they are available to him from the drivers side of the seat. When it is desired to relax while making out the reports, the driver may then sit on the passenger side with his body conveniently fitting within the cut-out provided by the curved edge portion at 24 and 26.

When it is desired to remove the desk from the vehicle so as to enable the entire front seat to be utilized, pin 20 is removed from bracket 18' and the desk is pulled outwardly from between the spaced apart lugs, leg 22 is then folded toward the first edge portion and within the channel member whereupon the desk may then be conveniently stored behind the seat, for example.

The padded material 31 cushions the circumferential extending edge portion of the mobile desk and prevents injury in the event of impact thereagainst as during an accident. The support leg 22 may alternatively be fabricated from telescoping hollow members having a friction lock at 62, 64 rather than the illustrated threaded bolt and nut arrangement.

It should be understood that bracket member illustrated in FIGURE 6 utilizes a vertical member which is fabricated in order to permit the member to be bent into any configuration so as to conform to the curvature of the instrument panel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:
1. A mobile desk for vehicles including a table having a flat self-supporting surface defined by a first edge portion adapted to be placed adjacent the instrument panel of the vehicle, spaced apart attachment means for securing said first edge portion of the desk to the instrument panel, a second edge portion, a third edge portion spaced apart from said first edge portion, and a fourth edge portion opposite said second edge portion;

said spaced apart attachment means further including a bracket having a vertical member with spaced apart depending lugs having means forming an aperture therethrough;

said first edge portion having means forming an aperture therethrough, said first edge portion being received between said spaced apart lugs, and a fastener means adapted to be received through the apertures of said lug and first edge portion;

said vertical member adapted to be rigidly affixed to the instrument panel to thereby secure each spaced apart attachment means thereto;

one said lug being formed by a limited length of the depending marginal end portion of said vertical member being turned outwardly in a direction perpendicular with respect to said vertical member;

whereby said bracket can be installed in a first direction to provide a first table height, and said bracket can be inverted to provide a second table height;

a longitudinal extending reinforcing member located between said first and third edge portions; and a support leg having a terminal end thereof attached to said reinforcing member and the remaining end of said support leg adapted to contact the floor of the vehicle.

2. The improvement of claim 1 wherein releasable fastener means is attached to the writing surface of the desk in a manner to secure objects thereto; said releasable fastener means being in the form of a "Velco fastener" which includes two individual layers of fabric material with one layer being affixed to the desk and the remaining layer adapted to be affixed to the object to be fastened to the desk.

3. The improvement of claim 1 wherein said vertical member is adapted to be bent into a configuration which conforms to the curvature of the dash.

4. The mobile desk of claim 1 and further including means forming a fastener located on the upper surface of the desk and adapted to cooperate with a fastener means provided on writing material which is adapted to be retained upon the surface of the desk.

5. The writing desk of claim 1 wherein said reinforcing member includes an inverted U-shaped channel rigidly secured to the bottom surface of the desk;

said support leg being pivotally received within said U-shaped channel, whereby said leg may be pivoted into close proximity of the bottom surface of the desk when not in use.

6. The mobile desk of claim 1, wherein said reinforcing member is an inverted U-shaped channel member rigidly attached to the bottom surface of the desk, and including a multiplicity of spaced apart apertures formed therein with said leg being received within one set of said apertures to thereby enable the position of the leg with respect to the first edge portion to be selected;

said leg having means associated therewith for adjusting the height thereof.

References Cited

UNITED STATES PATENTS

| | | | |
|---|---|---|---|
| 397,108 | 2/1889 | Brown et al. | 108—43 |
| 878,080 | 2/1908 | Massey | 108—43 |
| 2,628,140 | 2/1953 | Bunce | 108—45 |
| 2,799,967 | 7/1957 | Molinari | 108—45 |
| 2,837,782 | 6/1958 | White | 52—716 XR |
| 2,867,484 | 1/1959 | Jennings | 108—45 |
| 2,904,378 | 9/1959 | MacIver. | |
| 2,954,310 | 9/1960 | Truesdell et al. | 52—716 X |
| 3,104,895 | 9/1963 | Feuerbach et al. | 108—45 X |
| 3,271,919 | 9/1966 | Olton | 52—716 |

JAMES T. McCALL, *Primary Examiner.*

G. O. FINCH, *Assistant Examiner.*